(12) United States Patent
Yoshida et al.

(10) Patent No.: US 8,726,888 B2
(45) Date of Patent: May 20, 2014

(54) ATMOSPHERE-OPENING STRUCTURE FOR CANISTER OF VEHICLE

(75) Inventors: Naoki Yoshida, Wako (JP); Yukio Hosoya, Wako (JP); Kazunori Kawame, Wako (JP); Shuhei Hatakeyama, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 942 days.

(21) Appl. No.: 12/727,661

(22) Filed: Mar. 19, 2010

(65) Prior Publication Data

US 2010/0242925 A1    Sep. 30, 2010

(30) Foreign Application Priority Data

Mar. 30, 2009 (JP) ................. 2009-081024

(51) Int. Cl.
  *F02M 33/02* (2006.01)
  *A63C 5/08* (2006.01)
  *A63C 17/12* (2006.01)
  *B60P 3/22* (2006.01)

(52) U.S. Cl.
  USPC .......................... 123/519; 180/225; 280/835

(58) Field of Classification Search
  USPC .......... 123/519, 520, 516, 518; 137/312, 587; 220/367.1, 564, 567.2, 567.1, 565, 220/23.83, 23.86; 180/69.4, 219, 225, 284, 180/314, 335; 280/835; 141/86, 326
  See application file for complete search history.

(56) References Cited

U.S. PATENT DOCUMENTS

| | | | | |
|---|---|---|---|---|
| 3,368,326 | A | * | 2/1968 | Hervert .......................... 96/109 |
| 3,683,597 | A | * | 8/1972 | Beveridge et al. ............ 123/519 |
| 4,646,701 | A | * | 3/1987 | Fukumoto ..................... 123/519 |
| 4,826,511 | A | * | 5/1989 | Harris ............................. 96/156 |
| 6,582,001 | B2 | * | 6/2003 | Yagisawa et al. ............. 296/37.1 |
| 6,851,499 | B2 | * | 2/2005 | Yagisawa et al. .............. 180/219 |
| 7,028,800 | B2 | * | 4/2006 | Yagisawa et al. .............. 180/219 |
| 7,624,829 | B2 | * | 12/2009 | Kubota ......................... 180/69.4 |
| 2002/0148665 | A1 | * | 10/2002 | Yagisawa et al. .............. 180/219 |
| 2002/0189877 | A1 | * | 12/2002 | Yagisawa et al. .............. 180/219 |
| 2010/0051369 | A1 | * | 3/2010 | Kuramochi et al. .......... 180/69.4 |
| 2010/0242925 | A1 | * | 9/2010 | Yoshida et al. ................ 123/519 |
| 2010/0243355 | A1 | * | 9/2010 | Hosoya et al. ................ 180/69.4 |

FOREIGN PATENT DOCUMENTS

JP        3-29573 Y2    6/1991

* cited by examiner

*Primary Examiner* — Stephen K Cronin
*Assistant Examiner* — Sherman Manley
(74) *Attorney, Agent, or Firm* — Westerman, Hattori, Daniels & Adrian, LLP (57) ABSTRACT

An atmosphere-opening structure is provided for a canister of a vehicle which can prevent invasion of dust and water drops from an atmosphere-opening passage by a simple configuration which is easy to produce. A fuel tray is provided around a fuel filler such that fuel leaking from the fuel filler to the outside upon refueling is received by the fuel tray. The fuel tray is covered with a fuel lid which can open and close the fuel filler from above. A drain hole for discharging fuel to the outside is provided in the fuel tray. An opening hose for communicating the canister and the atmosphere with each other is provided. An opening end of the opening hose is communicated with a position higher than the drain hole in the fuel tray.

6 Claims, 5 Drawing Sheets

ATMOSPHERE-OPENING STRUCTURE FOR CANISTER OF VEHICLE

TECHNICAL FIELD

An atmosphere-opening structure for a canister is disclosed which is incorporated in a saddle type vehicle such as a motorcycle and collects fuel gas evaporated in a fuel tank.

BACKGROUND OF THE INVENTION

In a saddle type vehicle such as a motorcycle, a canister for collecting evaporated fuel in a fuel tank is provided, and the fuel collected by the canister is used for combustion in an engine.

The canister includes a fuel collection section for absorbing evaporated fuel by means of activated carbon or the like. To the fuel collection section, a charge passage for introducing evaporated fuel in the fuel tank into the canister, a purge passage for purging the fuel absorbed by the fuel collection section with external air and supplying the purged fuel to an intake system of the engine as well as an atmosphere-opening passage for allowing the fuel collection section to communicate with the atmosphere are connected.

Since the atmosphere-opening passage is open at an end portion thereof to the outside, there is the possibility that dust on the road surface or in the atmosphere or water drops of rainwater or the like may penetrate the inside of the atmosphere-opening passage from the opening end of the same. Therefore, an atmosphere-opening structure for a canister for avoiding this has been proposed (refer to, for example, Japanese Utility Model Publication No. Hei 3-29573).

In the atmosphere-opening structure for a canister disclosed in Japanese Utility Model Publication No. Hei 3-29573, the atmosphere-opening passage connected to the fuel collection section of the canister is branched into two branch passages, and one of the branch passages is disposed such that the opening end thereof is directed downwardly in the proximity of the road surface while the other branch passage is attached at the opening end thereof to a vehicle body frame on the upper side of a tank frame or the like. Further, a check valve for preventing absorption of dust or water drops from the road surface is provided for the one branch passage disposed in the proximity of the road surface.

SUMMARY OF THE INVENTION

However, in this conventional atmosphere-opening structure, since the atmosphere-opening passage is branched into two branch passages and the check valve is provided for the one branch passage, the structure is complicated and the manufacture is difficult.

Further, in this atmosphere-opening structure, although the opening end of the other branch passage is provided at a position spaced away from the road surface, since this is exposed to the external air, the possibility of invasion of dust or water drops through the opening end of the other branch passage still remains, and some consideration is required.

An atmosphere-opening structure for a canister of a vehicle is provided which can prevent invasion of dust and water drops from an atmosphere-opening passage by a simple configuration which is easy to produce.

An atmosphere-opening structure for a canister of a vehicle which includes a fuel tank (for example, a fuel tank 50 in an embodiment hereinafter described) for storing fuel, a fuel filler (for example, a fuel filler 52a in the embodiment hereinafter described) for introducing fuel into the fuel tank, a fuel tray (for example, a fuel tray 55 in the embodiment hereinafter described) of a concave shape disposed around the fuel filler for receiving fuel leaking to the outside from the fuel filler upon fueling, a fuel lid (for example, a fuel lid 58 in the embodiment hereinafter described) for covering the fuel filler and the tray in a closed position and being openable and closable, a canister (for example, a canister 30 in the embodiment hereinafter described) for collecting evaporated fuel in the fuel tank, and an atmosphere-opening passage (for example, an opening hose 37 in the embodiment hereinafter described) for communicating the canister and the atmosphere with each other, is characterized in that an opening end (for example, an opening end 37a in the embodiment hereinafter described) of the atmosphere-opening passage is connected with the inside of the fuel tray.

By this configuration, the atmosphere is introduced into the atmosphere-opening passage through a space surrounded by the fuel tray and the fuel lid, and dust on the road surface or in the atmosphere, water drops and so forth become less likely to penetrate the inside of the atmosphere-opening passage.

The atmosphere-opening structure is further characterized in that the fuel tray has a drain hole (for example, a drain hole 57a in the embodiment hereinafter described) for discharging the fuel flowing into the inside of the fuel tray to the other side therethrough, and the opening end of the atmosphere-opening passage is connected at a position higher than the drain hole with the fuel tray.

By this configuration, even if fuel leaking from the fuel filler upon fueling drops into the fuel tray, the fuel is discharged to the outside from the drain hole positioned downward of the opening end of the atmosphere-opening passage.

The atmosphere-opening structure is further characterized in that the fuel tray includes a swollen portion (for example, a swollen portion 72 in the embodiment hereinafter described) which is swollen to the outer side with respect to the fuel lid, and the opening end of the atmosphere-opening passage is connected at the swollen portion thereof with the inside of the fuel tray.

By this configuration, a hole in the fuel tray which is connected with the opening end of the atmosphere-opening passage is disposed at a position displaced to the outer side of a lid opening on the vehicle body side which is opened by the fuel lid.

The atmosphere-opening structure is further characterized in that the fuel lid and the fuel tray are disposed forward of a seat to be seated by a passenger, and the swollen portion of the fuel tray is swollen to the rear side with respect to a rear edge portion of the fuel lid.

By this configuration, the hole in the fuel tray which is connected with the opening end of the atmosphere-opening passage is disposed at a position displaced to the seat rearwardly with respect to the lid opening on the vehicle body side.

Since the atmosphere-opening passage is connected with the space surrounded by the fuel tray and the fuel lid, invasion of dust, water drops and so forth from the atmosphere-opening passage can be prevented without adding any complicated structure. As a result, suppression of the product cost and improvement of the merchantability can be anticipated.

Since the opening end of the atmosphere-opening passage is connected at a position higher than the drain hole in the fuel tray, it is possible to prevent invasion of fuel leaking into the fuel tray from the fuel filler upon fueling into the atmosphere-opening passage.

Since the hole in the fuel tray is disposed at the outer side of the lid opening on the vehicle body side, when the fuel lid is opened, the hole in the fuel tray is less likely to be observed from the outside, and improvement of the appearance quality can be anticipated.

Since the hole in the fuel tray is disposed at a position displaced to the seat rearwardly with respect to the lid opening on the vehicle body side, the hole in the fuel tray is less likely to be observed by a passenger or an operator who is in the proximity of the seat through the lid opening, and further improvement of the appearance quality can be anticipated.

BRIEF DESCRIPTION OF THE DRAWINGS

The advantages of the invention will become apparent in the following description taken in conjunction with the drawings, wherein.

DETAILED DESCRIPTION OF THE INVENTION

In the following, an embodiment of the present invention is described with reference to the drawings. It is to be noted that, unless otherwise specified, the directions such as the forward, rearward, leftward and rightward directions in the following description coincide with the directions with reference to the vehicle. Further, in the figures, an arrow mark FR denotes the vehicle forward direction and another arrow mark UP denotes the vehicle upward direction.

Figure 1:
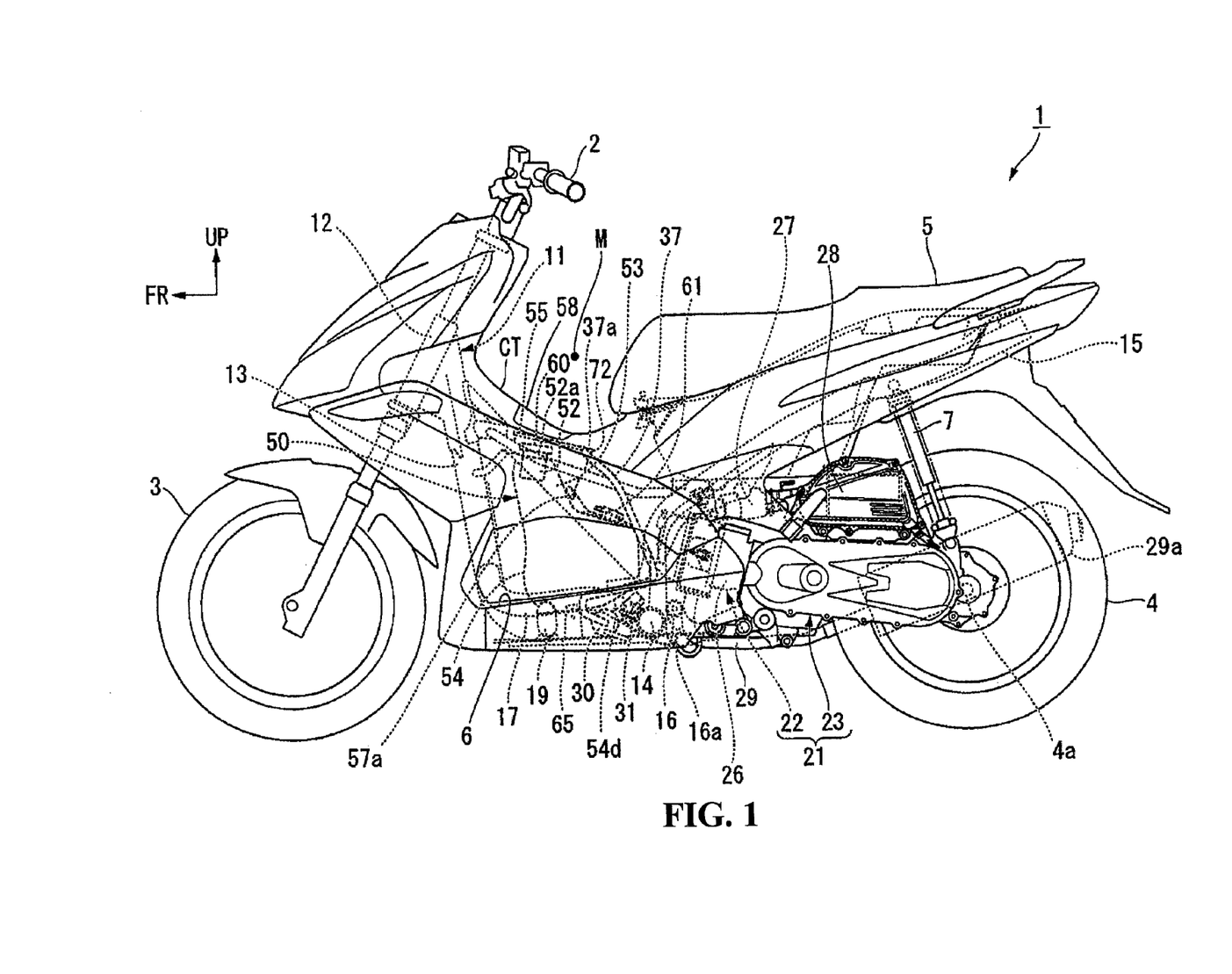
FIG. 1 is a left side elevational view of a motorcycle.

FIG. 1 is a view showing a side face of a motorcycle 1 of the scooter type (scooter type vehicle) of an embodiment of the present invention.

As shown in FIG. 1, this motorcycle 1 includes a front wheel 3 steered by a handle bar 2 and a rear wheel 4 driven by a swing unit (power unit) 21.

Steering system parts including the handle bar 2 and the front wheel 3 are supported for steering movement on a head pipe 12 at a front end of a vehicle body frame 11. The swing unit 21 is supported at a front end portion thereof for upward and downward rocking motion to a rear portion of the vehicle body frame 11. A saddle type seat (hereinafter referred to simply as seat) 5 for a passenger is disposed on the vehicle body rear side with respect to the handle bar 2, and a straddling section M depressed a downwardly with respect to the seat 5 is provided between the handle bar 2 and the seat 5. Floor steps 6 for receiving the feet of a passenger seated on the seat 5 thereon are provided on the opposite left and right sides of the straddling section M. A center tunnel section CT having a swollen sectional shape which is upwardly convex is provided between the left and right floor steps 6 such that it extends in a vehicle body forward and rearward direction. This center tunnel section CT is formed from a panel member made of resin or metal.

FIGS. 2 to 5 are views showing a region from a front end portion to an intermediate portion of the vehicle body frame 11 and various parts attached to the vehicle body frame 11.

The vehicle body frame 11 includes the head pipe 12 for supporting the steering system parts such as the handle bar 2 and the front wheel 3, a main frame 13 extending obliquely downwardly from the head pipe 12, a pair of left and right sub frames 17 (not shown in FIG. 2) joined to a lower edge portion of the main frame 13 from the opposite left and right sides and extending from the joined portions thereof toward the vehicle body rear side after they are curved to the outer sides in the vehicle widthwise direction, a cross frame 14 extending in the vehicle body widthwise direction at the position of rear ends of the sub frames 17 and having rear end portions of the sub frames 17 joined thereto, and a pair of rear frames 15 extending upwardly from the opposite side edge portions of the cross frame 14 and then extending obliquely rearwardly upwards of the vehicle body.

A sub cross frame 19 curved downwardly and extending in the vehicle widthwise direction is joined to front edge portions of the left and right sub frames 17, and a curved lower end of the main frame 13 is joined to a central portion of the sub cross frame 19. Further, a pivot bracket 16 (refer to FIG. 1) is attached to a rear portion of the cross frame 14, and the swing unit 21 is connected at a front end portion thereof for upward and downward rocking motion on the pivot bracket 16.

Figure 3:
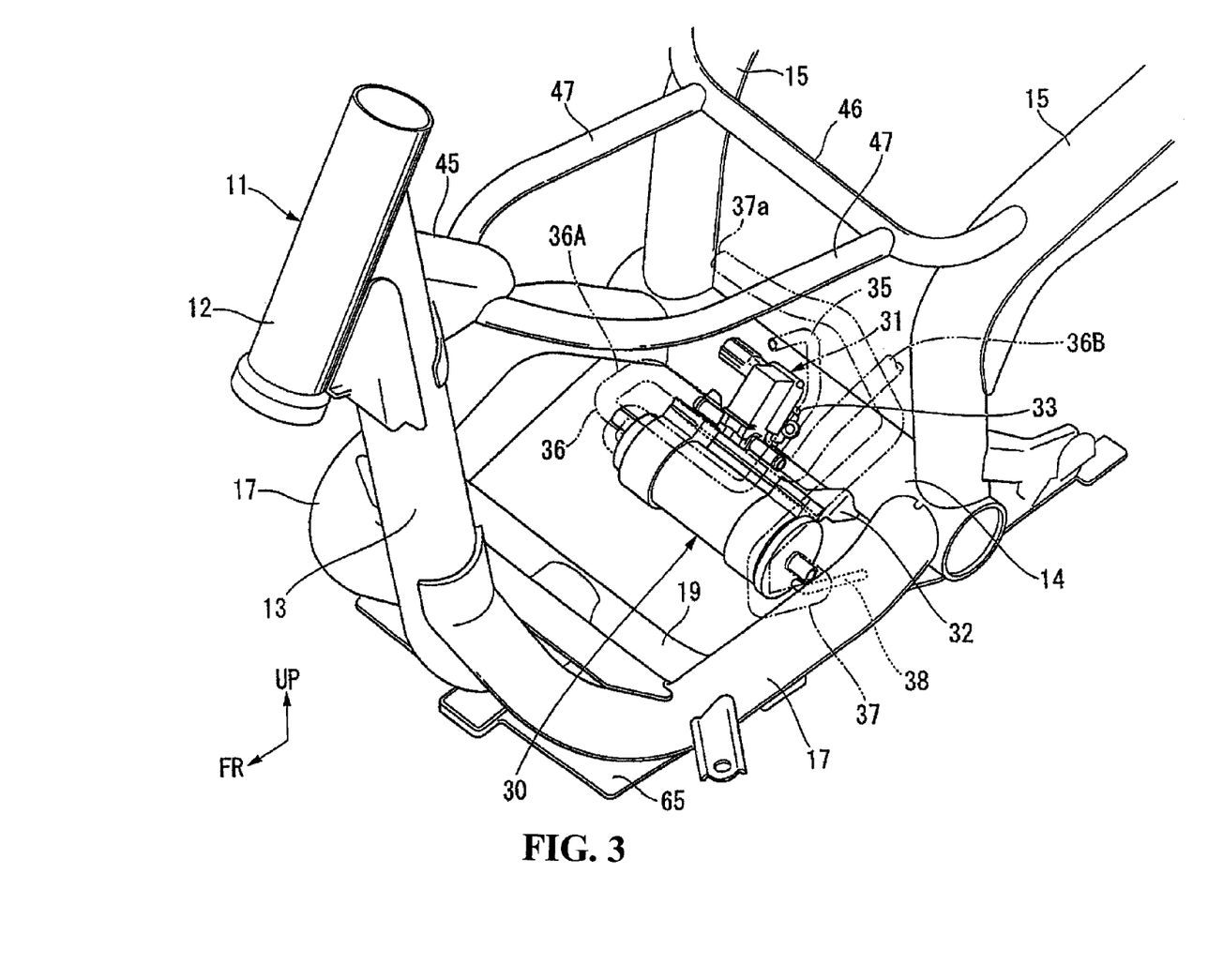
FIG. 3 is a perspective view showing a central portion of the motorcycle with covers, a fuel tank and so forth removed.
Figure 4:
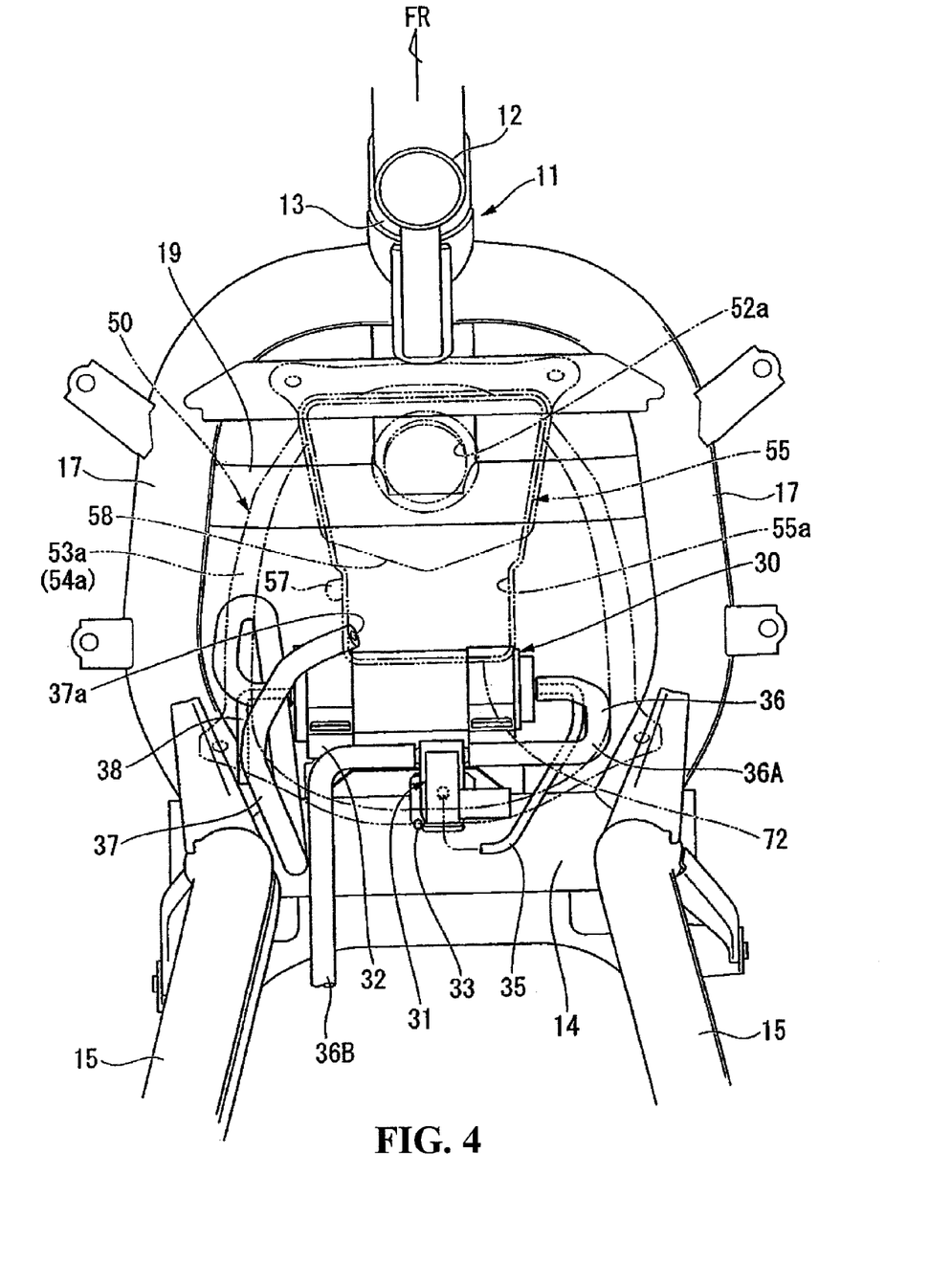
FIG. 4 is a top plan view showing a central portion of the motorcycle with covers, the fuel tank and so forth removed.
Figure 5:
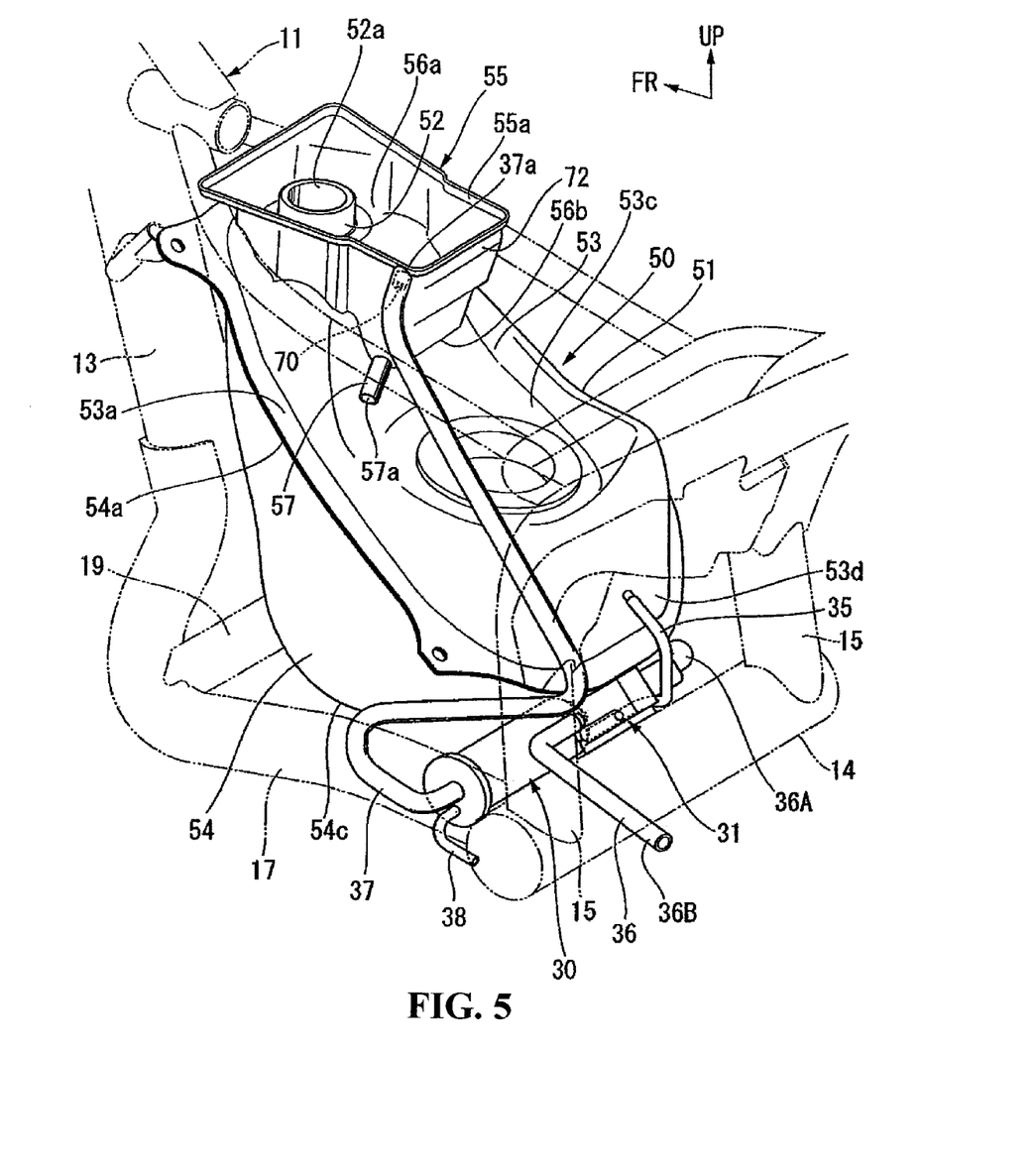
FIG. 5 is a perspective view showing a central portion of the motorcycle with covers, a vehicle body frame and so forth removed.

Further, a fixing block 45 which projects to the rear side as shown in FIG. 3 is provided in the proximity of an upper end portion of the main frame 13, and a sub cross frame 46 for connecting the rear frames 15 is provided at upper ends of the upwardly extending portions of the rear frames 15. Left and right edge portions of the fixing block 45 and the sub cross frame 46 are connected to each other by upper sub frames 47.

The swing unit 21 shown in FIG. 1 is a swing type power unit wherein an engine 22 and a power transmitting mechanism 23 are formed as an integrated block, and is connected at a front end portion thereof to the pivot bracket 16 through a suspension link 16*a*. A rear cushion 7 is interposed between a rear end portion of the power transmitting mechanism 23 and a rear frame 15, and vibration or impact upon traveling is absorbed by the rear cushion 7.

The engine 22 (internal combustion engine) is a water-cooled single cylinder engine wherein a crankshaft (not shown) is disposed so as to extend in the vehicle widthwise direction, and a head portion of the cylinder 26 projects to the front side in such a manner that it is inclined in an obliquely upward direction rather than a horizontal direction.

Meanwhile, the power transmitting mechanism 23 includes a belt type variable speed change gear, and is disposed on a left side portion of the engine 22 and transmits rotating power of the engine 22 to a rear wheel axle 4*a*.

Further, an air cleaner 28 is connected to the intake side of the engine 22 through a throttle body 27, and a silencer 29*a* on the vehicle body rear side is connected to the exhaust side of the engine 22 through an exhaust pipe 29.

A fuel tank 50 for reserving fuel to be used by the engine 22 is disposed in a space surrounded by the main frame 13, the left and right sub frames 17 and the upwardly extending portions of the left and right rear frames 15.

The fuel tank 50 is configured such that a feed fuel pipe 52 formed from a circular steel pipe is jointed integrally by welding or the like to an upper portion of a tank body 51 which is an article produced by presswork of a steel plate. An opening at an upper end portion of the feed fuel pipe 52 is used as a fuel filler 52*a*, and this fuel filler 52*a* is removably closed up with a filler cap 60.

The tank body 51 is configured such that a tank upper half 53 which forms an upper half of the tank body 51 and a tank lower half 54 which forms a lower half of the tank body 51 are joined integrally with each other by welding. A parting plane B (refer to FIG. 2) between the tank upper half 53 and the tank lower half 54 is inclined rearwardly downwards, and joining flanges 53a and 54a of the tank upper half 53 and the tank lower half 54 are provided along the parting plane B. The joining flanges 53a and 54a are provided continuously on the front and rear and the left and right of the tank body 51, and the joining flanges 53a and 54a are supported at front portions and rear portions thereof on the vehicle body frame 11.

Figure 2:
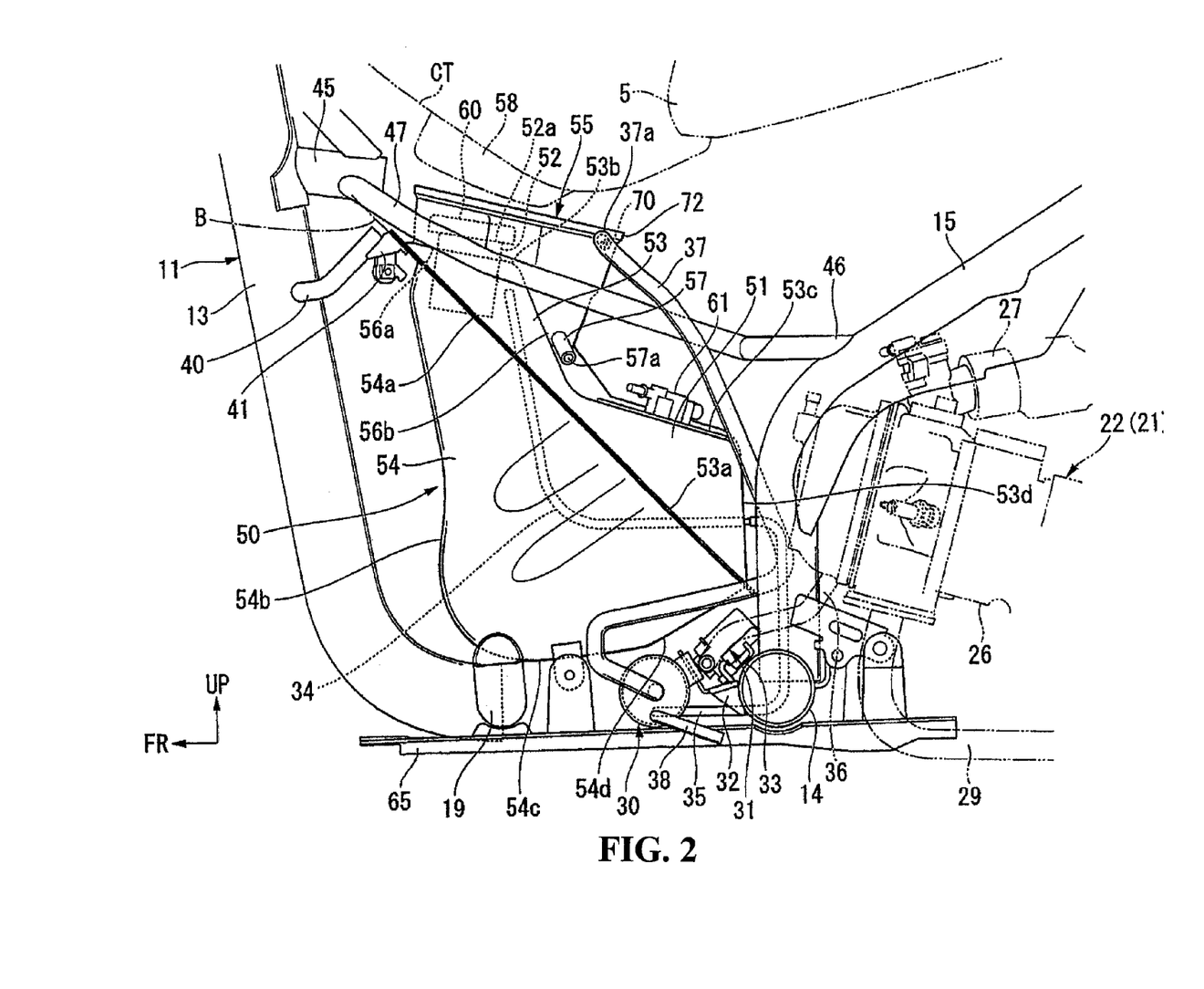
FIG. 2 is a side elevational view showing a central portion of the motorcycle with covers and sub frames removed.

More particularly, as shown in FIG. 2, the joining flanges 53a and 54a are connected to left and right brackets 40, which are provided fixedly at the opposite left and right edge portions on the front side thereof, each through a fixing block 41 and are coupled at the opposite edge portions on the rear portion side thereof to a connecting portion among three members of the cross frame 14, sub frame 17 and rear frame 15 through brackets and gussets (not shown).

The tank upper half 53 is a pressed part (pattern shaped member) of a concave shape which is open to the lower side, and the joining flange 53a is formed in a circumferential region of the lower side opening. The tank upper half 53 includes a front upper wall 53b connecting to a front region of the joining flange 53a and having the feed fuel pipe 52 provided at a substantially central portion thereof, a rear upper wall 53c provided continuously to a rear end portion of the front upper wall 53b in such a manner as to be bent to the substantially downward direction, and a rear wall 53d bent vertically downwardly from a rear end portion of the rear upper wall 53c and connecting to a rear region of the joining flange 53a. The rear wall 53d is opposed to a head portion of the engine 22 of the swing unit 21, which is disposed on the rear side with respect to the rear wall 53d, with a predetermined gap left therebetween. Further, a fuel pump 61 for pressure feeding fuel reserved in the fuel tank 50 toward an injector (not shown) of the engine 22 is provided fixedly on the rear upper wall 53c.

The tank lower half 54 is a pressed part (pattern shaped member) of a concave shape open to the upper side, and the joining flange 54a is formed in a circumferential region of the upper side opening. The tank lower half 54 includes a front wall 54b extending downwardly from a front region of the joining flange 54a, a bottom wall 54c bent to the rear side from a lower end of the front wall 54b and extending substantially horizontally, and a rear inclined wall 54d inclined upwardly rearwards from a rear end of the bottom wall 54c and connecting to a rear region of the joining flange 54a. The inclination angle of the rear inclined wall 54d is set such that it defines a substantially right angle with respect to the joining flange 54a which extends along the parting plane B.

Here, supplementarily describing the inclination angle of the rear inclined wall 54d, the inclination angle of the rear inclined wall 54d is determined taking a die cutting property in pressing and the volume assurance of the fuel tank 50 into consideration when the tank lower half 54 is shaped by pressing (die forming).

In particular, in order to achieve an increase in the tank volume during pressing of the tank lower half 54, the die of a pressing apparatus is designed such that the joining flange 54a portion comes to the parting portion, it is effective to increase the extension angle of the rear inclined wall 54d from the joining flange 54a to the vertically downward side. However, if the die cutting property upon pressing at this time is taken into consideration, then with regard to the inclination angle of the rear inclined wall 54d, an angle along the die cutting direction becomes a critical angle upon die cutting. That is, an angle substantially equal to the right angle to the joining flange 54a becomes a critical angle upon die cutting. Accordingly, from such a background as just described, the inclination angle of the rear inclined wall 54d is set such that it makes a substantially right angle to the joining flange 54a.

Incidentally, a canister 30 and a purge control valve 31 are attached to the cross frame 14 positioned rearwardly of the fuel tank 50 through stays 32 and 33, respectively.

The canister 30 is provided to absorb fuel evaporated in the fuel tank 50 so that the absorbed fuel is used for combustion upon operation of the engine 22 and is configured such that a fuel collection section composed of activated carbon or the like is provided in the inside of a canister body of a substantially cylindrical shape. Meanwhile, the purge control valve 31 is provided to control the fuel purge in the canister 30 and is controlled by a controller (not shown).

The canister 30 is disposed along the vehicle widthwise direction in a space forward of the cross frame 14 and downward of the rear inclined wall 54d of the tank lower half 54. The purge control valve 31 is disposed in a space on the obliquely upper front side of the cross frame 14 and below the rear inclined wall 54d such that it is positioned adjacent the canister 30 on the rear upper side of the canister 30.

As shown in FIG. 2, a gas exhaust passage 34 for exhausting evaporated fuel in an upper portion of the fuel tank 50 to the outside of the fuel tank 50 through the rear wall 53d of the tank upper half 53 of the fuel tank 50 is provided in the fuel tank 50.

A charge hose 35 connected to the gas exhaust passage 34 of the fuel tank 50 and a purge hose 36 connected to the intake system of the engine 22 are connected in parallel to each other to one end side (vehicle body right side) in the axial direction of the canister 30. An opening hose 37 (atmosphere-opening passage) for communicating the fuel collection section and the atmosphere with each other and a drain pipe 38 for discharging fuel and water drops to the outside are connected in parallel to each other to the other end side (vehicle body left side) in the axial direction of the canister 30. The purge control valve 31 is interposed in the purge hose 36 which connects the canister 30 and the intake system of the engine 22 to each other. It is to be noted that reference symbol 36A denotes a hose on the upstream side (fuel tank 50 side) of the purge hose 36, and 36B a hose on the downstream side (engine 22 side) of the purge hose 36.

Further, reference symbol 65 in the figure denotes an undercover for covering the fuel tank 50, canister 30 and so forth from below.

A fuel tray 55 for receiving fuel leaking from the fuel filler 52a to the outside upon refueling is attached to an upper portion near to a front portion of the fuel tank 50. The fuel tray 55 is formed in a substantially concave shape open upwardly, and a bottom wall 56a on the front side of the fuel tray 55 is placed on the front upper wall 53b of the fuel tank 50 while the feed fuel pipe 52 projecting from the fuel tank 50 extends upwardly through the bottom wall 56a on the front side of the fuel tray 55. Consequently, the fuel filler 52a is disposed on the inner side of the fuel tray 55.

A bottom wall 56b on the rear side of the fuel tray 55 projects downwardly substantially in a V shape, and a drain pipe 57 which projects sidewardly downward of the vehicle body is provided at a side portion of the bottom wall 56b projecting substantially in the V shape. A drain hole 57a for communicating the inside and the outside of the fuel tray 55 with each other is provided in the drain pipe 57. The drain hole 57a discharges fuel flowing out from the fuel filler 52a into the inside of the fuel tray 55 upon refueling.

An opening 55a at an upper portion of the fuel tray 55 is formed in a distorted rectangle which somewhat narrows rearwardly, and a connecting port 70 for communicating the inside and the outside of the fuel tray 55 with each other is provided at an upper edge portion of one side of the opening 55a (upper edge portion on the vehicle body left side). An opening end 37a of the opening hose 37 is connected to the connecting port 70. It is to be noted that the connecting port 70 of the fuel tray 55 is disposed at a position higher than the drain hole 57a.

A fuel lid 58 for openably closing the upper side of the fuel filler 52a and the fuel tray 55 is provided on the center tunnel section CT on the front side of the seat 5. Upon refueling, the fuel lid 58 is opened and the filler cap 60 is removed, and then fuel is filled into the fuel tank 50.

The inside space of the fuel tray 55 with which the opening end 37a of the opening hose 37 is communicated is normally (when the fuel lid 58 is in a closed state) closed up on the upper side thereof with the fuel lid 58 so as to prevent admission of dust and water drops from the outside.

Incidentally, the opening 55a of the fuel tray 55 does not have a size equal to that of the closed fuel lid 58 but is swollen on the rear side thereof to the vehicle body rear side with respect to the closed fuel lid 58. The region of the fuel tray 55 over which it is swollen to the vehicle body rear side with respect to the fuel lid 58 is hereinafter referred to as swollen portion 72.

The connecting port 70 connected to the opening hose 37 is provided at this swollen portion 72. Also, the bottom wall 56b and the drain pipe 57 on the rear side described hereinabove are provided at the swollen portion 72.

Since the motorcycle 1 configured in such a manner as described above is structured such that the opening end 37a of the opening hose 37 connected to the canister 30 is communicated with the inside space of the fuel tray 55 covered with the fuel lid 58 from above, invasion of dust and water drops from the drain pipe 57 can be prevented with certainty by the simple configuration which can be produced very readily without adding a complicated structure such as a check valve or a branch passage.

Accordingly, by adopting such an atmosphere-opening structure for the canister 30 as described above, a stabilized performance of the canister 30 can be maintained over a long period of time while significant increase of the product cost is prevented.

Further, in the atmosphere-opening structure for the canister 30 adopted by the motorcycle 1, since the opening end 37a of the opening hose 37 is communicated with a position higher than the drain hole 57a in the fuel tray 55, fuel flowing into the fuel tray 55 upon refueling can be prevented from flowing into the opening hose 37 through the opening end 37a. Accordingly, a stabilized performance of the canister 30 can always be maintained.

Further, in the structure of the present embodiment, since the swollen portion 72 which is swollen to the vehicle body rear side with respect to the closed fuel lid 58 is provided on the fuel tray 55 and the connecting port 70 for connecting the opening hose 37 is provided at the swollen portion 72, when the fuel lid 58 is opened for fueling or the like, the connecting port 70 is not observed readily from the inner side of the fuel lid 58. Particularly in the case of the present embodiment, since the swollen portion 72 of the fuel tray 55 is disposed in a somewhat displaced relationship to the seat 5 on the rear side with respect to the fuel lid 58, the inner side of the swollen portion 72 can hardly be observed by a passenger or an operator who is in the proximity of the seat 5 in a situation wherein the fuel lid 58 is open. This is advantageous where it is intended to raise the appearance quality.

It is to be noted that the present invention is not limited to the embodiment described above but allows various changes of design without departing from the subject matter of the invention. For example, the atmosphere-opening structure for a canister described above can be applied not only to a motorcycle having the center tunnel section CT but also a saddle type vehicle which does not have the center tunnel section CT but has a substantially flat floor step and a saddle type vehicle which does not have a floor step but has a step bar or a step board.

Further, the atmosphere-opening structure for a canister can be applied also to motorcycles other than those of the scooter type and to three-wheel vehicles and four-wheel vehicles if they have a fuel lid, a fuel filler and a fuel tray for receiving fuel leaking from the fuel filler upon refueling.

Although a specific form of embodiment of the instant invention has been described above and illustrated in the accompanying drawings in order to be more clearly understood, the above description is made by way of example and not as a limitation of the scope of the instant invention. It is contemplated that various modifications apparent to one of ordinary skill in the art could be made without departing from the scope of the invention which is to be determined by the following claims.

We claim:

1. An atmosphere-opening structure for a canister of a vehicle, comprising:
   a fuel tank for storing fuel,
   a fuel filler through which fuel is introduced into said fuel tank,
   a fuel tray surrounding said fuel filler, said fuel tray having a concave shape and receiving fuel which leaks from said fuel filler upon fueling,
   a fuel lid which covers said fuel filler and said fuel tray in a closed position, said fuel lid being openable and closable,
   a canister which collects evaporated fuel from said fuel tank, and
   an atmosphere-opening passage connecting said canister and the atmosphere,
   wherein an opening end of said atmosphere-opening passage is connected to an inside of said fuel tray,
   wherein said fuel tray includes a drain hole for discharging fuel from said inside of said fuel tray, and
   wherein said opening end of said atmosphere-opening passage is connected to said inside of said fuel tray at a position higher than said drain hole.

2. The atmosphere-opening structure according to claim 1, wherein said fuel tray includes a swollen portion which extends relative to said fuel lid, and
   wherein said opening end of said atmosphere-opening passage is connected to said inside of said fuel tray at said swollen portion.

3. The atmosphere-opening structure according to claim 2, wherein said fuel lid and said fuel tray are disposed forward of a passenger seat, and
   wherein said swollen portion of said fuel tray extends to the vehicle-rearward side relative to a rear edge portion of said fuel lid.

4. The atmosphere-opening structure according to claim 1, wherein said opening end of said atmosphere-opening passage is disposed at a position of the inside of said fuel tray which is outside a position of said fuel lid, said fuel lid being disposed in a panel member of a center tunnel section of the vehicle.

5. The atmosphere-opening structure according to claim 2, wherein said opening end of said atmosphere-opening passage is disposed at a position of the inside of said fuel tray which is outside a position of said fuel lid, said fuel lid being disposed in a panel member of a center tunnel section of the vehicle.

6. The atmosphere-opening structure according to claim 3, wherein said opening end of said atmosphere-opening passage is disposed at a position of the inside of said fuel tray which is outside a position of said fuel lid, said fuel lid being disposed in a panel member of a center tunnel section of the vehicle.

\* \* \* \* \*